JAMES B. FORSYTH.
Improvement in the Manufacture of Tubing.
No. 127,755. Patented June 11, 1872.
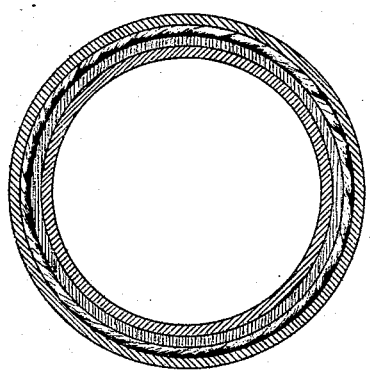
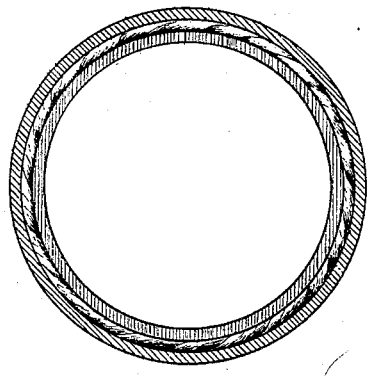
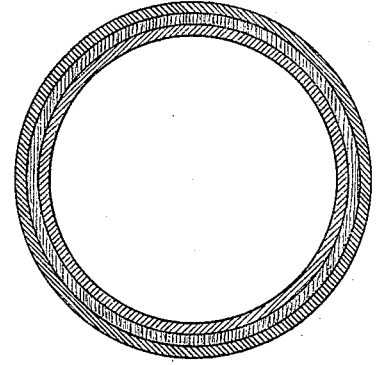
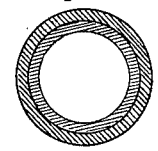

127,755

UNITED STATES PATENT OFFICE.

JAMES B. FORSYTH, OF BOSTON, MASSACHUSETTS.

IMPROVEMENT IN THE MANUFACTURE OF TUBINGS.

Specification forming part of Letters Patent No. 127,755, dated June 11, 1872.

I, JAMES B. FORSYTH, of Boston, in the county of Suffolk and State of Massachusetts, have invented certain Improvements in Tubing, of which the following is a specification:

In the drawing, Figure 1 is a section of a piece of hose or other tubing, for gas, water, or other fluid, the interior tube or layer being of the common vulcanized rubber, the one next that of an unvulcanizable rubber, the third a seamless tube formed of strands braided or woven together, and the fourth or exterior tube or layer of common vulcanized rubber. Fig. 2 is a section of a piece of hose or other tubing, consisting of a seamless tube coated externally and internally, and having its meshes filled with vulcanized rubber. Fig. 3 is a section of a piece of tubing, designed more especially for gas and similar fluids, the interior tube or layer being of the common vulcanized rubber such as is generally used for tubing, the next of pure rubber, vulcanized or not, and the exterior a seamless tube formed of strands braided or woven together. Fig. 4 is a section of a piece of tubing, also designed for gas, one of the tubes or layers being of common vulcanized rubber, and the other of pure rubber, vulcanized or not. Fig. 5 is a section of a piece of tubing, also designed for gas, precisely like Fig. 3, except that the exterior tube is of vulcanized rubber.

In Letters Patent No 79,220, granted to me June 23, 1868, a process is described and claimed for manufacturing hose and other tubing like that shown in Fig. 1, and the first part of my present invention relates to and consists in a new process for manufacturing tubing of the kind described in that patent, and other tubing, consisting of a seamless tube lined with a water-proof lining. When making tubing of the kind described in my former patent, the interior vulcanized tube or lining is formed in all respects as described in that patent; but instead of being inserted in the seamless tube and therein distended so that the unvulcanizable rubber will cause the vulcanized rubber tube and the seamless tube to adhere together, the seamless tube is formed over the distended rubber tube, strain enough being applied to the strands forming the seamless tube as they are braided, woven, or otherwise applied, to cause them to be partially buried in the comparatively soft unvulcanized rubber, and thus cemented firmly to the vulcanized lining. The main feature of novelty of the process which forms this part of my invention consists in the use of a mandrel of water or other heavy fluid, which retains its place in relation to the braider as the tube is fed along; and the main object of this part of my invention is to obviate certain difficulties incident to the use of a rigid mandrel (which will be obvious without explanation) where hose or tubing of any considerable length is to be made, or where it is for any reason necessary to deflect the hose or tubing during the covering process. In most cases I prefer to use an unvulcanizable compound of rubber to form the outer surface of the lining and to act as a cement, as above explained; but it will be obvious that its use is not an essential part of this process. In all cases it is preferable to vulcanize the rubber tube to some extent, as the unvulcanized compound is difficult to handle, so as to produce perfect work, for reasons well known to all skilled in the art. Where a firm adhesion of the seamless tube and lining is important and it is not desired to use a cement, I vulcanize the lining to only a slight extent—just enough to give it the requisite tenacity—and complete the vulcanization after the seamless tube is applied, thus cementing together the rubber lining and the seamless tube. In most cases I use water as a mandrel, for cheapness, and because it does not act on the rubber compound injuriously. This water mandrel is U-shaped, and it is clear that it will retain its position as the tube is fed along, and that the pressure upon the interior of the tube at the point where the covering apparatus acts can be readily regulated, either by the head of water, or by inflating the tube on each side of the water-mandrel, letting the air in this case escape gradually from the uncovered portion of the tube as it is fed along, and adding air gradually to the covered portion in order to keep it distended, as well as to keep the water-mandrel in its proper position. When the tube to be covered lacks strength, or is not water-tight, a rubber tube, or a tube of some other suitable material, should be inserted in it; or it should be formed over this rubber tube, which will serve to confine the water or other fluid, and which can be removed after the tube is covered by discharging the fluid and collapsing the tube to be removed.

The process constituting the second part of my invention consists in braiding a seamless tube, when the strands of which it is formed are immersed in rubber cement, just before they unite to form the tube, so that they will be saturated with the cement, and the tube formed will be a braided tube coated externally and internally, and having the spaces between its strands filled with rubber. To illustrate this process I will describe the mode of manufacturing tubing of the kind shown in Fig. 2. In making that tubing a preliminary tube of rubber compound, unvulcanized, is first formed upon a pole in the usual way, and while remaining upon its pole is fed upright through the braider and through a reservoir of rubber cement, the level of the cement being kept above the point where the strands unite to form the tube, the pole and tubing passing through an aperture in the bottom of the cement-reservoir. When it is not convenient, from the length of the pole or otherwise, to feed that through the braider upright, the pole is removed and the water-mandrel substituted in its place, as before described; or an air-mandrel may be used, as described in the English patent No. 1,861, of 1857. In all cases I prefer to use such an air-mandrel or a water-mandrel. I also prefer to use a preliminary tube of rubber, vulcanized only partially, as thereby the union between the braided tube saturated thoroughly with the vulcanizable cement and the preliminary tube is more perfect after vulcanization. In practice several layers of strands are used, forming several distinct tubes, one on the other, each consisting of a tube coated externally and internally, and having its meshes filled with vulcanized rubber, and each firmly united to the others. Pure rubber cement may be used, as is obvious, instead of the vulcanizable cement. When a preliminary tube is not used, its place must be supplied by some other suitable former.

I am aware that tubes have heretofore been constructed of strands saturated or covered with rubber and its compounds, as described in Letters Patent No. 39,237, granted to Thomas J. Mayall July 14, 1863, where the threads or strands were first covered with rubber and then dried, and after that woven or braided into a tube; but this process of manufacturing such tubes lacks the distinguishing feature which constitutes the novelty of my process, viz., uniting the strands together into a tube while immersed, at the point where they unite, in rubber cement.

A description of Figs 3, 4, and 5 will illustrate the third part of my invention, which consists in a tube formed of one or more tubes of pure rubber and one or more tubes of the ordinary vulcanized rubber, which, by reason of the tube or tubes of pure rubber, is almost wholly impermeable to gas, and by reason of the tube or tubes of the ordinary vulcanized rubber, can be manufactured at a small cost with all the necessary strength.

In the tube shown in Fig. 3, the braided or woven covering is designed more for ornament than for strength, and therefore it is neither important nor desirable that it be embedded in the pure rubber tube; and this pure rubber tube is not designed, as in Fig. 1, for a cement to unite together the seamless tube and the vulcanized rubber tube, but is intended to render the tube less permeable, and therefore this intermediate tube must be made of pure rubber, with or without a sufficient quantity of sulphur to vulcanize it—that is to say, none of the ingredients generally used to make a vulcanizable compound, such as white oxide of zinc, whiting, white lead, &c., should be used, as these all render the compound sufficiently porous to allow the permeation of gas; but when this intermediate tube is formed of rubber alone, or of rubber compounded with a small quantity of sulphur, enough to vulcanize it, the tubing thus formed will be almost if not entirely impermeable, although the intermediate tube be very thin, even if less than one thirty-second of an inch thick. Care must, of course, be taken that this intermediate tube be without flaws, and therefore the strands of the covering should be applied with much less force than when tubing like that shown in Fig. 1 is made; all that is necessary or desirable is, that the covering should be in contact with the intermediate tube. For ordinary gas-tubing for drop-lights, &c., I prefer to form this intermediate tubing of pure rubber, to which a sufficient quantity of sulphur has been added to vulcanize it, and to vulcanize the tubing before applying the covering. Fig. 4 shows a section of tubing so formed before the covering is applied, the two tubes of which it is composed being one of them, of common vulcanized rubber, as that term is generally used—that is, of rubber compounded with a variety of other ingredients in addition to sulphur—the main object being to cheapen the tubing by diminishing the quantity of rubber in it, while the other is of pure rubber—the purpose of the latter being to prevent the permeation of the gas, while the former serves as a support for and gives the necessary strength to the latter.

When but two tubes or layers are used, as in Fig. 4, it is, of course, desirable to put the most important of the two—viz., that of pure rubber—within the other, as it is less liable to injury; but inasmuch as pure rubber unvulcanized is affected by various circumstances which do not affect it if vulcanized, in practice I generally compound with the pure rubber, which is designed to form this tube, sulphur enough to vulcanize it, using as little as possible, as too much sulphur will make the compound, both before and after it is vulcanized, permeable to gas. I have found that tubing of pure rubber is practically impermeable, and that whether the pure rubber be vulcanized or not; and the object of this part of my invention is simply to make a cheaper impermeable tubing by using a thin tube of pure rubber, in combination with a protecting tube of the common vulcanized rubber.

When I desire to use pure rubber, unvulcanized, I usually protect it both externally and internally by tubes of the common vulcanized rubber, as shown in Fig. 5, and these protecting tubes may be made of any cheap compound.

It will be obvious that I do not claim, broadly, covering the tube, whether of rubber or other material, with a tube formed of strands braided, woven, or otherwise secured together, as this is the subject matter of Mayall's patent first above referred to; and this part of my invention has no reference to this, broadly, but is limited to an improved method of accomplishing it. Also, that I make no broad claim to the use of strands, saturated or otherwise, covered with rubber in the manufacture of tubing, as this forms the subject matter of Mayall's patent second above referred to; but that I limit myself to the method above described of uniting the strands together into a tube while the point of union of the strands is below the level of the rubber cement in which the tube is formed.

What I claim as my invention is—

1. The process above described for manufacturing tubing, consisting in covering a tube with a seamless tube, formed of strands, while the tube to be covered is distended or inflated by a water-mandrel, over which the tube moves as it is fed along, all substantially as specified.

2. The process above described of manufacturing tubing, consisting in braiding a seamless tube of strands, while the strands are immersed, at the point where they unite to form the tube, in rubber cement, all substantially as described.

3. As a new article of manufacture, a tube composed of one or more tubes of pure rubber, vulcanized or not, and one or more tubes of the ordinary vulcanized rubber, whether with or without other lining or covering, substantially as above described.

JAMES B. FORSYTH.

Witnesses:
J. E. MAYNADIER,
J. B. SANFORD.